(12) United States Patent
Tao

(10) Patent No.: US 9,914,176 B2
(45) Date of Patent: Mar. 13, 2018

(54) ROTARY TOOL

(71) Applicant: CHERVON INTELLECTUAL PROPERTY LIMITED, Road Town (VG)

(72) Inventor: Shichun Tao, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 783 days.

(21) Appl. No.: 14/500,406

(22) Filed: Sep. 29, 2014

(65) Prior Publication Data

US 2015/0090471 A1 Apr. 2, 2015

(30) Foreign Application Priority Data

Sep. 30, 2013 (CN) .......................... 2013 1 0460831
Sep. 30, 2013 (CN) ..................... 2013 2 0614519 U

(51) Int. Cl.
| | |
|---|---|
| *B23B 31/36* | (2006.01) |
| *B23Q 3/12* | (2006.01) |
| *B25F 3/00* | (2006.01) |
| *B25B 23/00* | (2006.01) |
| *B23B 31/107* | (2006.01) |

(52) U.S. Cl.
CPC .......... *B23B 31/36* (2013.01); *B23B 31/1071* (2013.01); *B23Q 3/12* (2013.01); *B25B 23/0035* (2013.01); *B25F 3/00* (2013.01)

(58) Field of Classification Search
CPC ....... B23B 31/36; B23B 31/1071; B23Q 3/12; B25B 23/0035; B25F 3/00
USPC ...................... 173/48, 216; 279/60
See application file for complete search history.

(56) References Cited

U.S. PATENT DOCUMENTS

| | | | |
|---|---|---|---|
| 5,437,465 A * | 8/1995 | Vogele ..................... | B23Q 3/12 279/22 |
| 7,201,235 B2 * | 4/2007 | Umemura ............. | B23B 45/008 173/104 |
| 2005/0150669 A1 * | 7/2005 | Umemura ............. | B23B 45/008 173/48 |

* cited by examiner

*Primary Examiner* — Michelle Lopez
(74) *Attorney, Agent, or Firm* — Greenberg Traurig, LLP

(57) ABSTRACT

A rotary tool for driving drill bits or screw bits. The rotary tool includes a main body, a main shaft, a chuck, and a locking assembly for locking the chuck at a fixed position relative to the main shaft in the axial direction. The locking assembly is arranged fixedly relative to the main body in the circumferential direction of the main shaft and it has a portion that contacted with the chuck when locking the chuck.

23 Claims, 8 Drawing Sheets ular direction of the main shaft and comprising a portion contacted with the chuck when locking it.

Further areas of applicability will become apparent from the description provided herein. It should be understood that the description and specific examples are intended for purposes of illustration only and are not intended to limit the scope of the present disclosure.

The locking assembly is arranged on the main body, thereby the cost of the chuck is reduced.

The user may choose various chucks with more specifications. Moreover, with the structure of the locking assembly, the locking assembly cannot rotate along with the main shaft and the chuck, thereby greatly enhancing the reliability of the connection.

Figure 1:
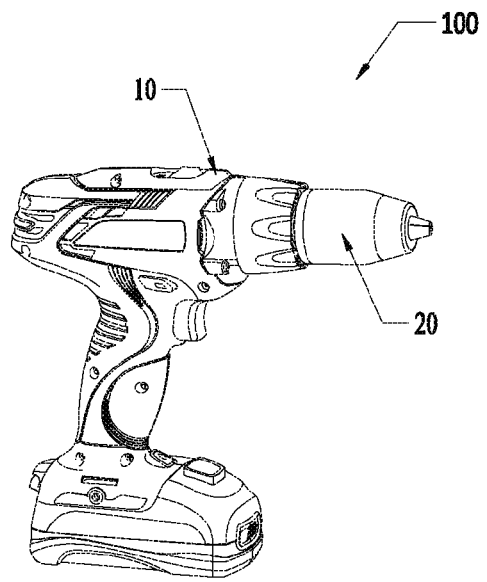
FIG. 1 is a schematic view of an exemplary rotary tool constructed according to the description which follows.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

The following descriptions are merely exemplary in nature and is in no way intended to limit the invention, its application, or uses.

Figure 3:
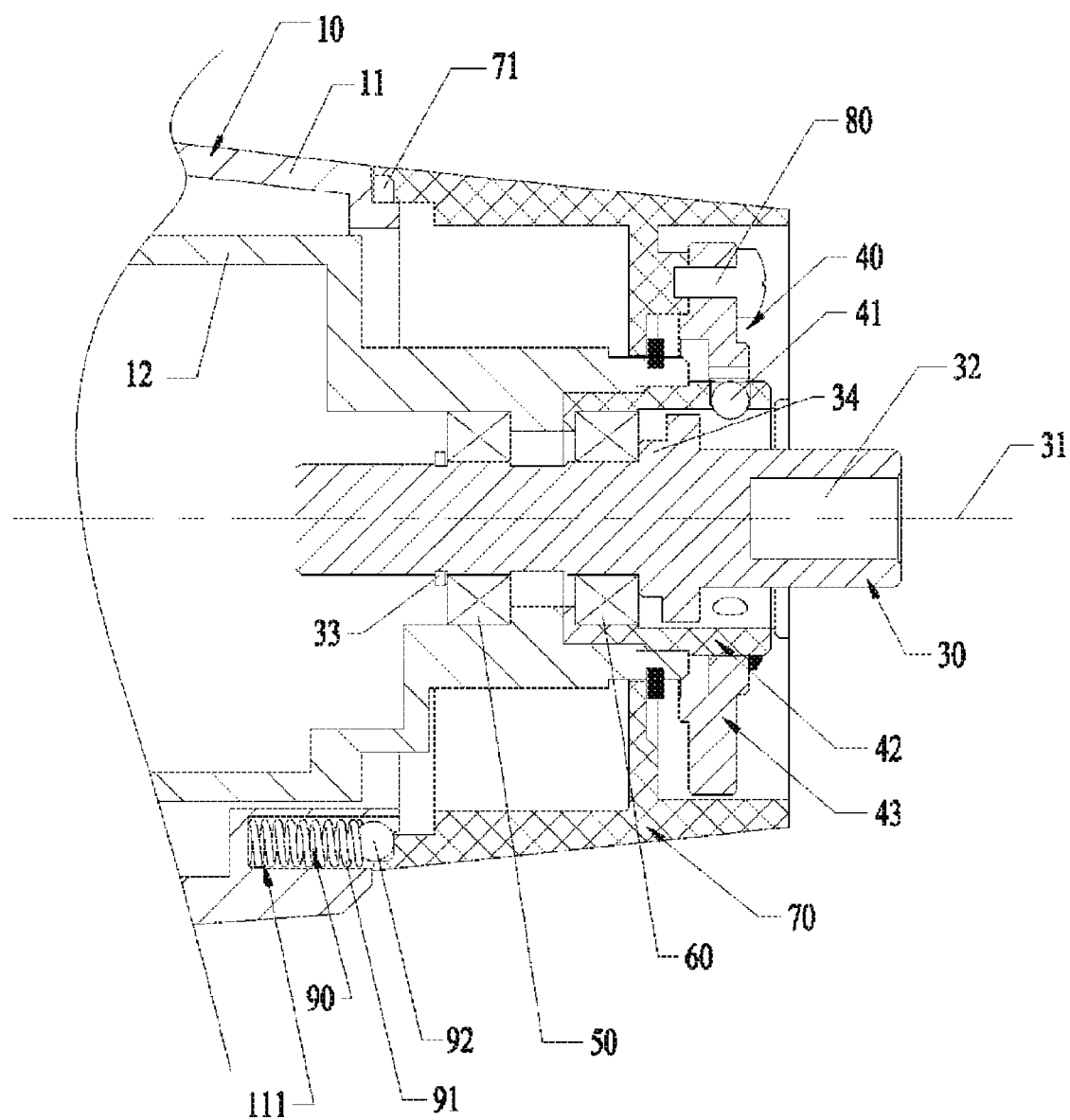
FIG. 3 is a schematic view of the inner structure of an exemplary main body of the tool in FIG. 1.
Figure 6:
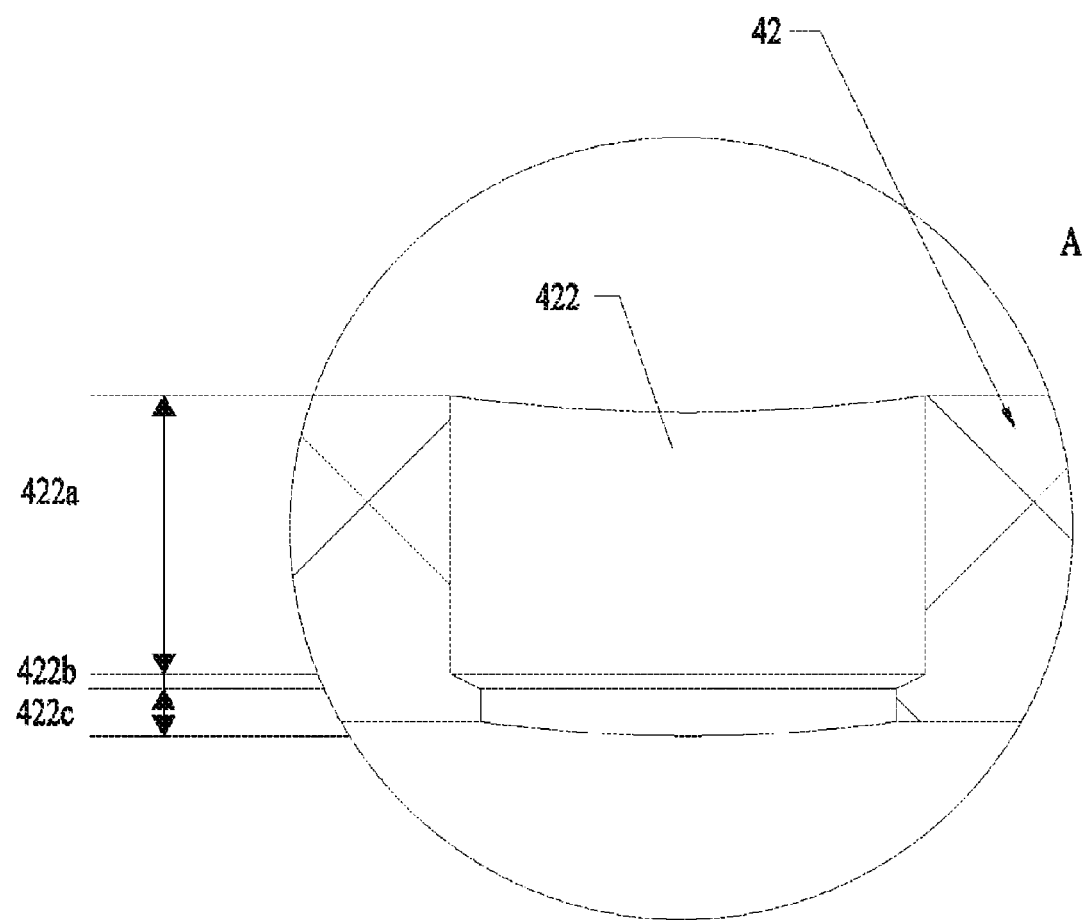
FIG. 6 is an enlarged sectional view of the structure in circle A in FIG. 5.

As shown in FIGS. 1, 3, and 6, a rotary tool 100 of the present disclosure mainly comprises a main body 10, a chuck 20 and a main shaft 30.

The main body 10 forms the main portion of the rotary tool 100, and at least comprises a housing 11.

The housing 11 accommodates a gearbox 12, a motor, and a transmission mechanism. The motor transmits torque to the main shaft 30 by the transmission mechanism so as to rotate relative to the main body 10. The chuck 20 is used to clamp various drill bits or screw bits having various functions.

The main shaft 30 is an axisymmetric body having a symmetric axis as the axis about which the main shaft 30 rotates.

Referring to FIG. 3, the rotary tool 100 of the present disclosure further comprises a locking assembly 40 installed on the main body 10. The locking assembly 40 can lock the relative position between the chuck 20 and the main body 10 in the axial direction, and the circumferential position of each part is not changed with the rotation of the main shaft 30.

It should be noted that in the present application, the three referenced dimensional directions include an axial direction, a radial direction and a circumferential direction which are defined by taking the direction of the axis 31 of the main shaft 30 as the axial direction. When the main shaft 30 is an axisymmetric body with the axis 31 as the symmetric axis, the axial direction, the radial direction and the circumferential direction defined in the present application refer to the axial direction, the radial direction and the circumferential direction of the main shaft 30.

Figure 2:
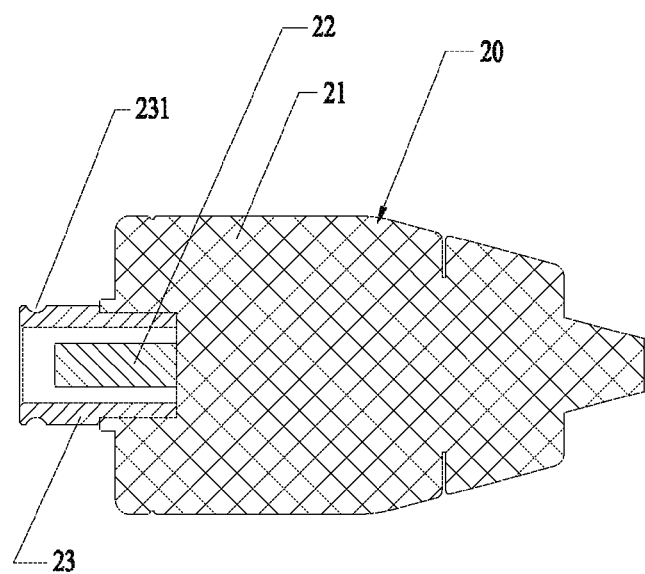
FIG. 2 is a sectional structure schematic view of an exemplary chuck for use with the tool in FIG. 1.

The chuck 20 of the present disclosure may be configured as shown in FIG. 2. The chuck 20 comprises a main body 21, a transmission shank 22 and a locking bush 23. The main body 21 is used to clamp the drill bits or screw bits.

The transmission shank 22 and the main shaft 30 are assembled to form a torque transmission. Preferably, the cross section of the transmission shank 22 at least has a straight edge. The main shaft 30 is provided with an inserting hole 32 into which the transmission shank 22 is partly inserted. Certainly, it may be configured to insert the main shaft 30 into the chuck 20. It is well known for the person skilled in the art that the main shaft 30 and the chuck 20 form a torque transmission, which is not the essential part of the present disclosure and thus not further described herein.

Preferably, the transmission shank 22 is a hexagonal element, and the inserting hole 32 is a mated hexagonal hole. The advantage of this configuration lies in that when the chuck 20 is not used, the inserting hole 32 can clamp common hexagon drill bits directly so as to serve as a screwdriver.

The locking bush 23 surrounds the outer side of the transmission shank 22, and a portion of the main shaft 30 can be inserted into the locking bush 23. The outer edge of the locking bush 23 is provided with an annular locking groove 231.

The locking bush 23 is used to enable the chuck 20 to have a portion for cooperating with the locking assembly 40 of the main body 10 and form the locking groove 231 for cooperating with the locking assembly 40.

As shown in FIG. 3, the locking assembly 40 comprises a moving member 41, an installing member 42 and a switching member 43.

The installing member 42 is a sleeve fixedly connected to the gearbox 12, and the main shaft 30 passes through the gearbox 12 and is connected to the inner transmission mechanism. Moreover, the main shaft 30 is rotatably connected to the gearbox 12 by a bearing 50 so that the main shaft 30 can be supported during rotation.

Figure 4:
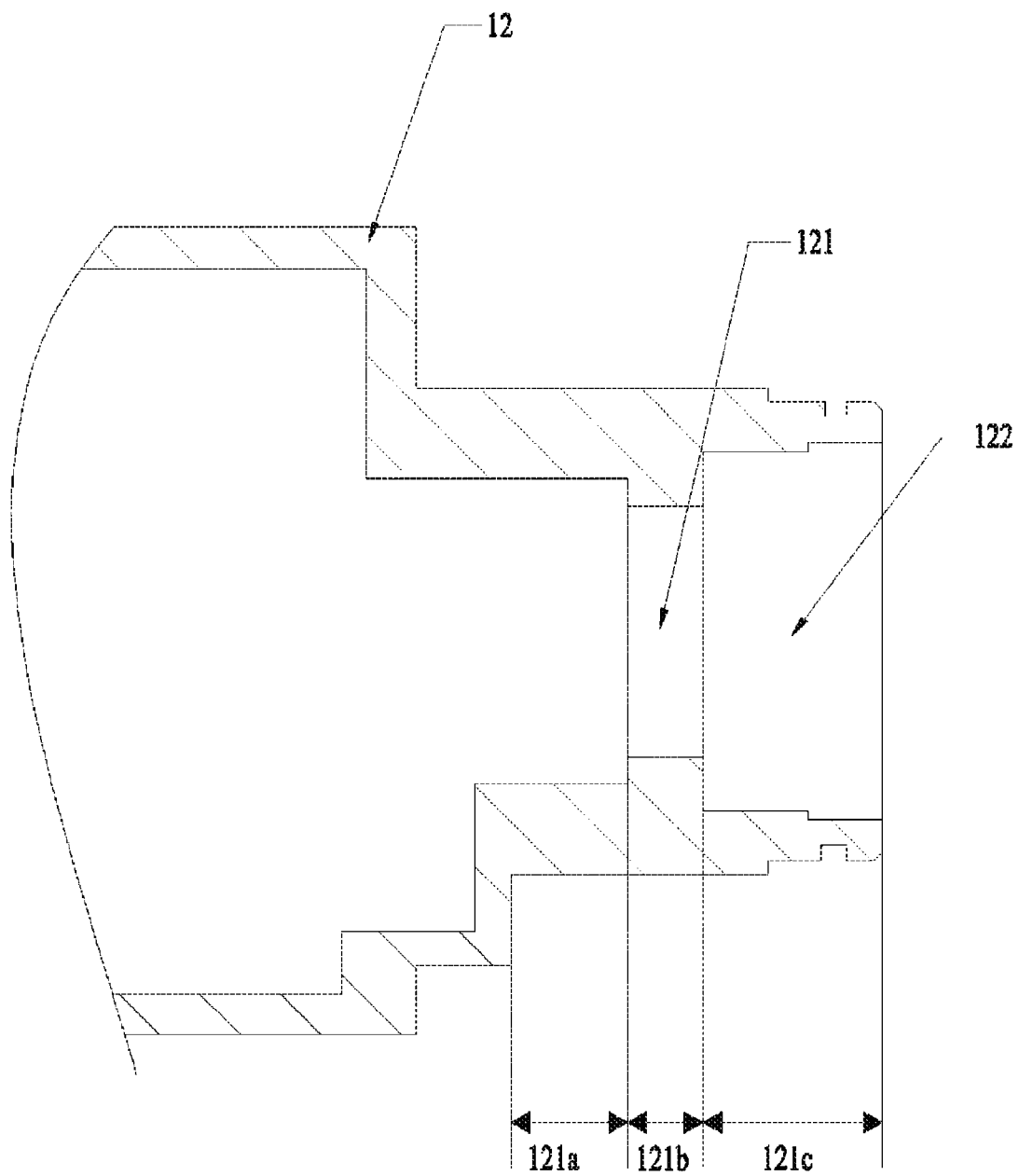
FIG. 4 is a sectional schematic view of an exemplary gearbox of the tool in FIG. 1.

Furthermore, as shown in FIGS. 3 and 4, in the axial direction, a shaft hole 121 of the gearbox 12 comprises an inner section 121a at the innermost side (the far left side in FIG. 3 or FIG. 4), an outer section 121c at the outer side, and a convex section 121b between the inner section 121a and the outer section 121c. The convex section 121b has a size smaller than that of the inner section 121a and the outer section 121c.

The convex section 121b protrudes from the inner section 121a and the outer section 121c.

As for the interior, the convex section 121b limits the axial position of the bearing 50 installed from the interior of the gearbox 12. During the insertion of the main shaft 30, the portion passing through the bearing 50 is provided with a collar 33. This solution stops the main shaft 30 from retracting from the gearbox 12 in the axial direction by the contact between the bearing 50 and the collar 33.

As for the exterior, the convex section 121b contacts the end surface of the installing member 42 so as to stop the installing member 42 from further moving closer to the gearbox 12 in the axial direction.

Preferably, a bearing 60 for mating with the main shaft 30 is arranged in the interior of the installing member 42, and the main shaft 30 has a shaft shoulder for locking with the end surface of the bearing 60 so as to indirectly limit the axial position of the installing member 42.

The convex section 121b and the outer section 121c of the shaft hole 121 form a receiving groove 122 for positioning the installing member 42, and the installing member 42 may be mounted in the receiving groove 122 in the axial direction.

It should be noted that after the installation of the installing member 42, the front end of the installing member 42 protrudes out from the gearbox 12. At least one positioning hole 422 is a radial through hole arranged in the protruding portion of the installing member 42 in the circumferential direction. All the positioning holes 422 correspond to the same axial position. The moving member 41 is arranged in the positioning holes 422.

Figure 5:
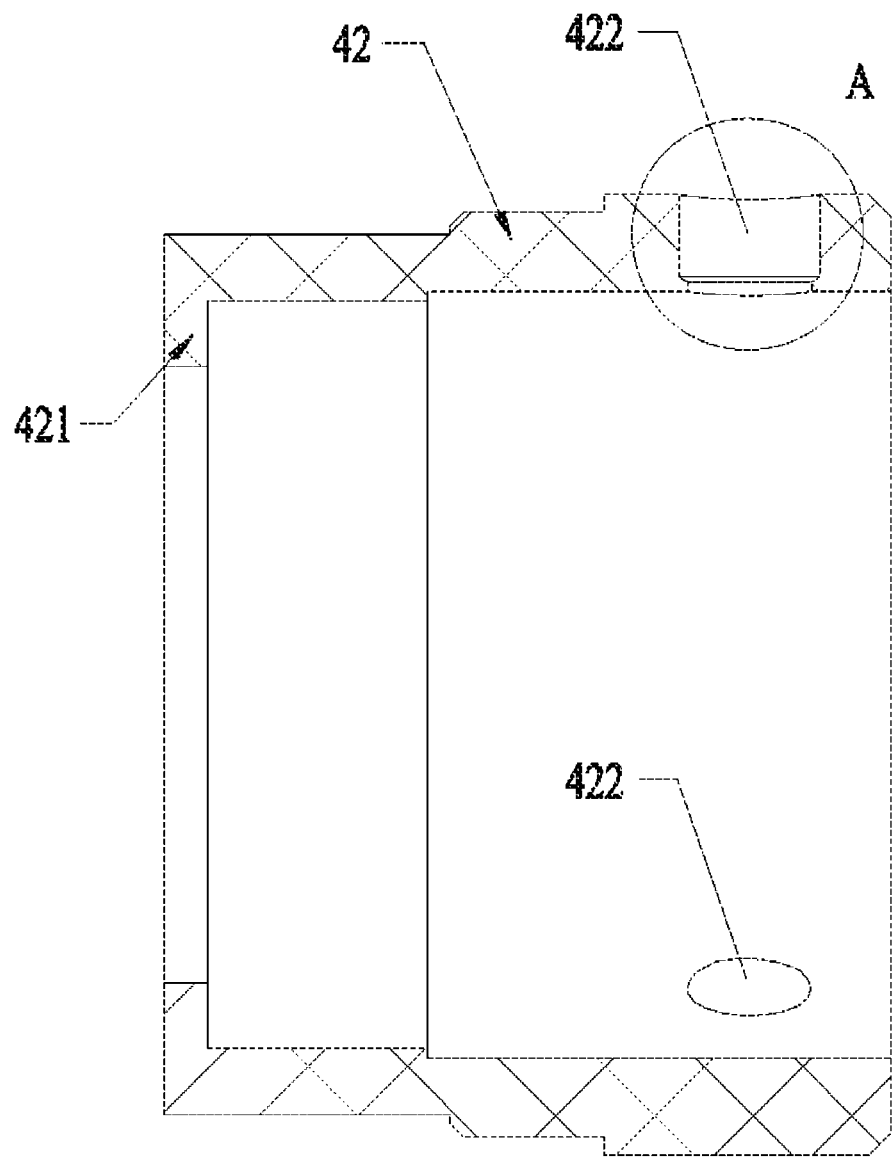
FIG. 5 is a schematic view of an exemplary installing member of the tool in FIG. 1.

As shown in FIG. 5, preferably, the moving member is spherical, and more preferably, the moving member is formed by a steel ball.

The positioning hole 422 is an axisymmetric hole having a symmetric axis perpendicular to the axial direction. The positioning hole 422 comprises a diametric accommodating section 422a having a diameter larger than the moving member 41, a diametric limiting section 422c having a diameter smaller than the moving member 41, and a transition section 422b arranged between the accommodating section 422a and the limiting section 422c and having a diameter decreasing from the exterior to the interior gradually. The accommodating section 422a is arranged on the outside of the positioning hole 422 relative to the limiting section 422c.

When the moving member 41 moves close to the main shaft 30, the limiting section 422c may stop the moving member 41 from further moving closer to the main shaft 30, and thereby provide a centripetal limiting.

In the present application, the centripetal limiting means than one member stops another member from moving closer to the axis 31 of the main shaft 30, while a centrifugal limiting means that one member stops another member from moving away from the axis 31 of the main shaft 30.

As in an extreme position as shown in FIG. 3, the moving member 41 partly protrudes out from the positioning hole 422 so as to extend into the interior of the installing member 42 and embed into the locking groove 231, thereby limiting the axial position of the chuck and preventing the chuck 20 from disengaging with the main body 10.

The extreme position of the moving member 41 adjacent to the main shaft 30 as shown in FIG. 3 may be regarded as the first position of the moving member 41.

It should be noted that the locking groove 231 can perform a limiting for the chuck 20 as long as the moving member 41 has a portion protruding out from the positing hole 422, and the moving member 42 does not need to be positioned in the first position. As the moving member 42 moves away from the main shaft 30 gradually, the limiting action for the locking groove 231 is decreased gradually. When the moving member 42 completely retracts from the installing member 42, i.e., the moving member 42 is completely positioned in the positioning hole 422, the moving member 42 cannot perform a limiting for the locking bush of the chuck 20.

When the moving member 41 is moved outwards until the edge thereof is tangent to the inner wall of the installing member 42, the moving member 41 is in a critical state which cannot perform a limiting for the locking bush 23, and then the position of the moving member 41 is in the second position.

It can be seen from the above that the moving member 41 can perform a limiting for the locking bush 23 in any position between the first position and the second position, thus one position in these positions may be regarded as the third position.

The switching member 43 may be switched so that the limiting for the moving member 41 changes. A position in which the switching member 43 can limit the moving member 41 so that the moving member 41 cannot move away from the main shaft 30 to the second position is the first type of position, while a position in which the switching member 43 provides the moving member 41 with a space that enables the moving member 41 to at least move away from the main shaft 30 to the second position is the second type of position.

The switching member 43 is an annular member surrounding the installing member 42.

For the switching between the two types of positions, the switching member 43 can not only rotate relative to the installing member 42, but also slide relative to the installing member 42.

Firstly, the solution in which the switching member 43 can rotate relative to the main body 10 is introduced.

Referring to FIG. 3, the switching member 43 and the main body 10 form a rotating connection through the clutch cup 70. The clutch cup 70 is a common member in the rotary tool 100. The clutch cup 70 and the main body 10 form a rotating connection with the axis 31 of the main shaft 30 as the axis. The switching member 43, fixedly connected to the clutch cup 70 and the main body 10, also forms a rotating connection with the axis 31 of the main shaft 30 as the axis.

Certainly, in the solution without the clutch cup 70, the switching member 43 may be provided independently as a member to be operated by the user.

In the solution as shown in FIG. 3, the switching member 43 is fixedly connected to the clutch cup 70 by a bolt 80.

The clutch cup 70 has an annular fixing plate 71 protruded inwardly from the clutch cup 70. The fixing plate 71 is provided with a through hole through which the front end of the gearbox 40 passes. The fixing plate 71 is provided a plurality of cylindrical bosses 711 with a threaded hole. The switching member 43 also has threaded holes at the corresponding positions, and then the switching member 43 is fixedly connected to the clutch cup 70 via the bolt 80.

Figure 7:
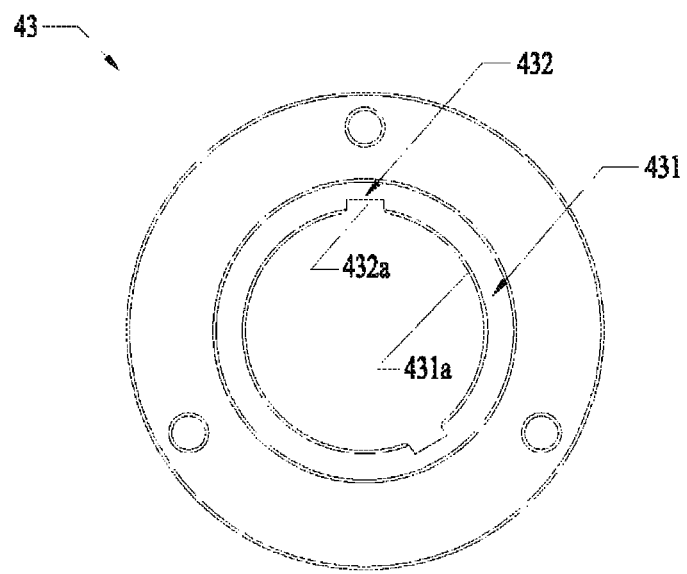
FIG. 7 is a schematic view of an exemplary switching member of the tool in FIG. 1.

As shown in FIG. 7, the switching member 43 comprises at least one pressing portion 431 which can press the moving member 41 into the locking groove 231 so as to perform a centrifugal limiting for the moving member 41, and at least one releasing portion 432 which enables the moving member 41 to have enough space to retract from the locking groove 231 so as to release the centrifugal limiting for the moving member 41 when aligned with the moving member 41. The releasing portion 432 is recessed outwardly relative to the pressing portion 431.

More specifically, the pressing portion 431 comprises at least two sections of arc-shaped circumferential pressing wall surfaces 431a formed in different circumferential positions in the switching member 43. The releasing portion 432 comprises at least one circumferential releasing groove 432a formed in the switching member 43 and recessed outwardly relative to the circumferential pressing wall surfaces 431a. The circumferential releasing groove 432a is arranged between the two circumferential pressing wall surfaces 431a in the circumferential direction.

Preferably, the circumferential pressing wall surface 431a is the arc-shaped inner wall of the switching member 43, and the circumferential releasing groove 432a is a notch groove arranged between the circumferential pressing wall surfaces 431a.

When the circumferential releasing groove 432a is aligned with the positioning hole 422 of the installing member 42 with the rotation, the moving member 41 has enough space to retract from the locking groove 231 so as to reach the second position. Thus, when the chuck 20 needs to be removed, the clutch cup 70 is rotated to force the switching member 43 so that the circumferential releasing groove 432a of the switching member 43 is aligned with the positioning hole 422 in the circumferential position. At that moment, the chuck 20 is pulled out away from the main body 10, and when the locking bush 23 moves outwards, the moving member 41 is pushed out away from the main shaft 30. Since the locking member 41 is not limited eccentrically, it moves outwards in a free state and does not prevent the chuck 20 from disengaging with the main body 10.

When the chuck 20 is locked, the circumferential pressing wall surface 431a of the switching member 43 limits the moving member 41. If the size is designed appropriately, the moving member 41 is just limited in the first position. But, preferably, considering the rolling of the moving member 41 itself, the radial size of the circumferential pressing wall surface 431a is enlarged appropriately, thus the moving member 41 still has moving space when the circumferential pressing wall surface 431a is aligned with the positioning hole 422. When the chuck 20 moves away from the main body 10 in the axial direction, the outer edge of the locking bush 23 contacts the moving member 41 to move it outwards. But, the circumferential pressing wall surface 431a forms a centrifugal limiting for the moving member 41 so as to limit the moving member 41 in the third position as defined in this application, and the chuck 20 is limited by hindering of the moving member 41.

Figure 8:
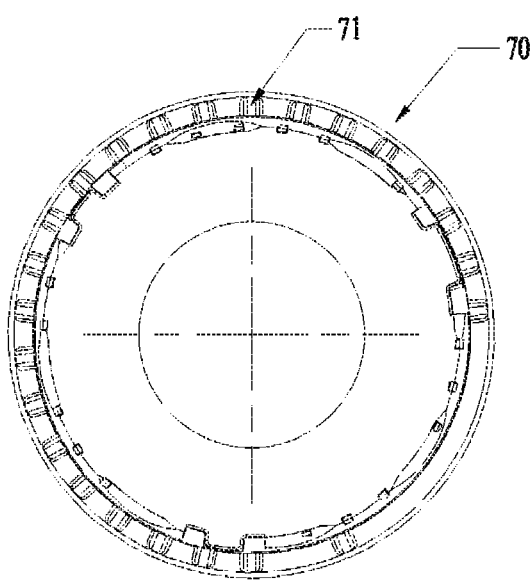
FIG. 8 is schematic view of an exemplary end portion of a clutch cup of the tool in FIG. 1.

In the solution as shown in FIG. 3, a circumferential positioning assembly 90 for maintaining the switching member 43 at a preset level in the circumferential direction. Specifically, the circumferential positioning assembly 90 comprises a spiral spring 91 for extending in the axial direction, and a ball member 92 for pushing the spiral spring away from the main body. The housing 11 is provided with an accommodating groove 111 for accommodating the spiral spring 91 and a portion of the ball member 92. As shown in FIGS. 3 and 8, the clutch cup 70 is provided with at least one stopping groove 71 at the end thereof adjacent to the main body 10 in the circumferential direction, and the ball member is partly embedded in the stopping groove 71. Certainly, it may be directly formed by the switching member 43 in the embodiment in which there is only a switching member 43. That is to say, the locking of the chuck 20 is achieved by the stopping structure of the clutch cup 70. As a preferred solution, upon the arrangement of the levels of the releasing groove 431 and the clutch cup 70, the zero level of the clutch cup 70 may correspond to the state of the positioning hole 422 corresponding to the releasing groove 431 so that the user may unlock the chuck 20 only in the zero level.

As a further preferred embodiment, as shown in FIG. 7, two releasing grooves 431 (see FIG. 3) are arranged and spaced from each other by 150 degree in the circumferential direction, thereby providing a fool proof design and preventing the user from misoperation.

In the embodiment as shown in FIG. 3, the circumferential positioning assembly 90 may also be used when the clutch cup 70 and the switching member 43 are configured as an integral switching ring (referred to as the switching member 43). As a more simple and reliable solution, a torque spring (not shown) is provided. One end of the torque spring is fixed to the main body 10 and the other end is fixed to the switching member 43, thus the switching member 43 always forces a pressing profile surface 432 to align with the positioning hole 422 when the spring is in the natural state. In this way, when the chuck needs to be removed, the user only needs to rotate the switching member 43 to a certain circumferential position so as to align the releasing groove 431 with the positioning hole 422. For facilitating the operation of the user, an arrow is arranged on the outside of the switching member 43 (specifically, the outside of the clutch cup 70). When the arrow is aligned with an arrow of the main body 10, it indicates that the releasing groove 431 is aligned with the positioning hole 422.

Next, the solution of the switching member 43' sliding relative to the main body 10' will be explained.

Figure 9:
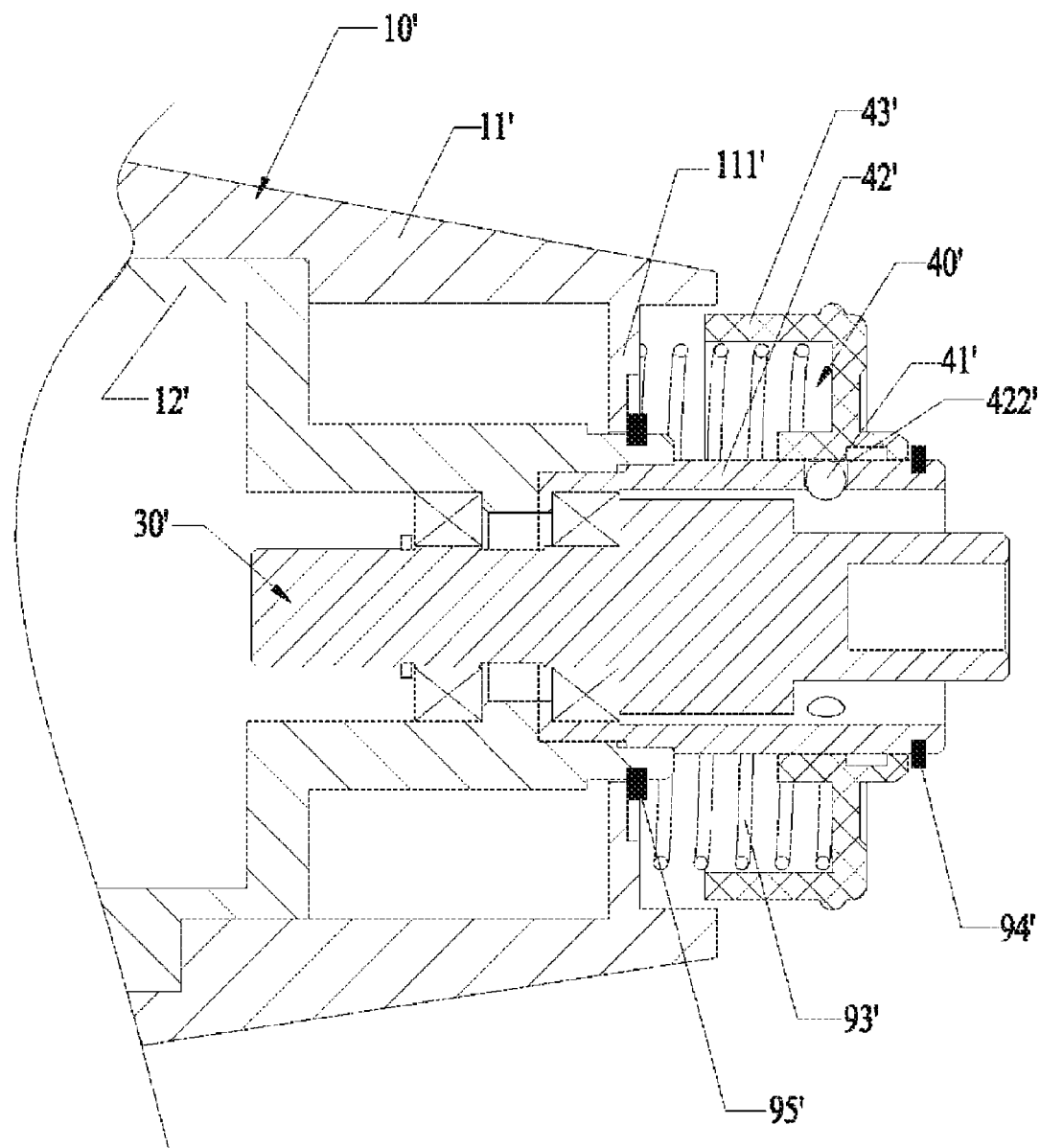
FIG. 9 is a partial schematic view of an exemplary rotary tool constructed according to description which follows.
Figure 10:
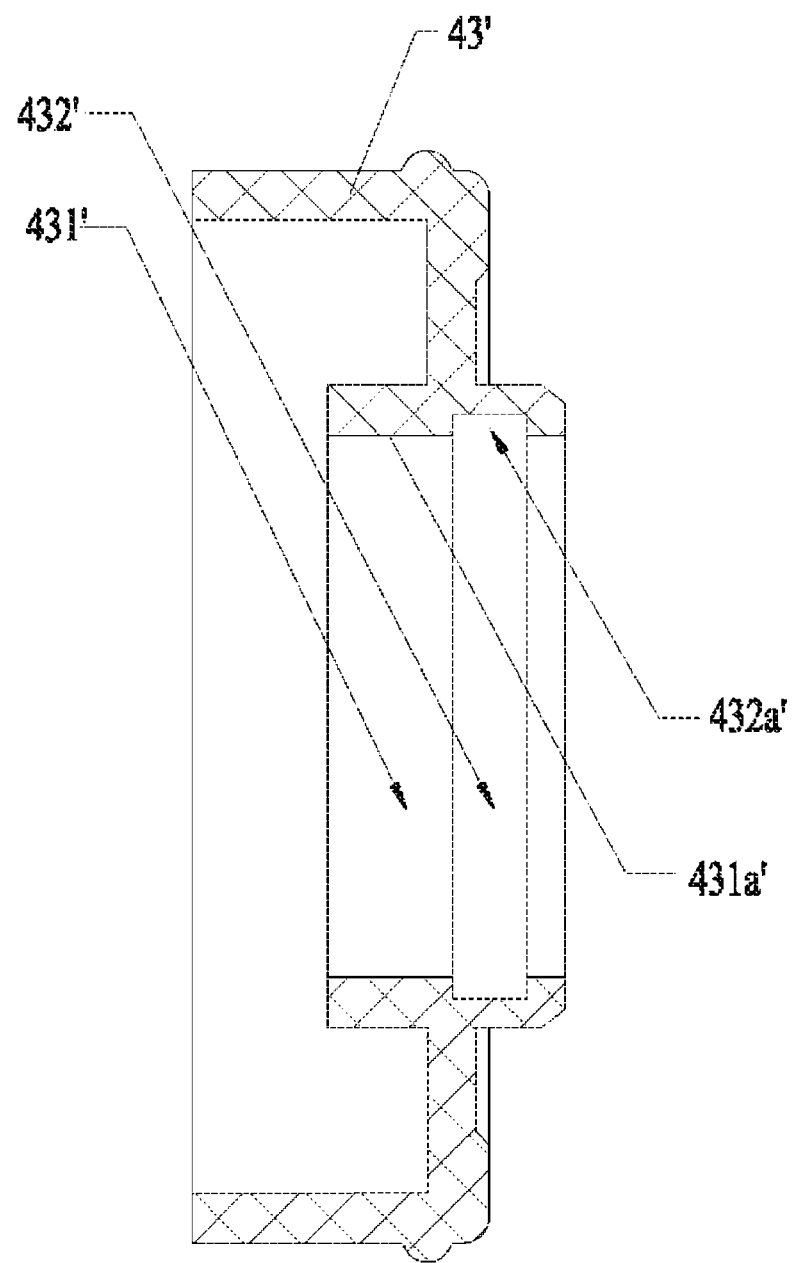
FIG. 10 is a schematic view of an exemplary operating member of the tool in FIG. 9.

As shown in FIGS. 9 and 10, in this solution, a main body 10', a main shaft 30', a moving member 41' and an installing member 42' in a locking assembly 40' have the same structure and assembly as the main body 10, the main shaft 30, the moving member 41 and the installing member 42 in the embodiment of FIG. 3. The only difference of the present embodiment lies in that it employs a switching member 43' configured to form a sliding connection with the main body 10' in the axial direction.

In this embodiment, the switching member 43' is also an annular member surrounding the installing member 42', and also comprises a pressing portion 431' and a releasing portion 432'.

The pressing portion 431' comprises a cylindrical axial pressing wall surface 431a' formed in the interior of the switching member 43'.

The releasing portion 432' comprises an annular axial releasing groove 432a' formed in the interior of the switching member 43' and recessed outwardly relative to the axial pressing wall surface 431a'.

The axial pressing wall surface 431a' of the switching member 43' is a cylindrical surface, and the axial releasing groove 432a' is an annular groove adjacent to the axial pressing wall surface 431a' in the axial direction. Certainly, the axial releasing groove 432a' may also be only formed in the position corresponding to the positioning hole 422' in the circumferential direction.

When the switching member 43' slides in the axially direction, the axial releasing groove 432a' or the axial pressing wall surface 431a' is optionally aligned with the moving member 41' so as to perform the switching between the locking and the unlocking, that is to say, the switching from the first type of position to the second type of position.

In order to perform the axial limiting and restoration for the switching member 43', as a preferred solution, a positioning assembly 90' comprises a sliding restoration member for forcing the switching member 43' to restore to the first type of position, a first limiting member for limiting the sliding travel of the switching member 43' at one side away from the main body 10', and a second limiting member for limiting the sliding travel of the switching member 43' at one side close to the main body 10'.

Specifically, the sliding restoration member may be a spiral spring 93', the first limiting member may be a first collar 94' fixed to the installing member 42' and the second limiting member is a second collar fixed to the installing member 42'. The second collar has similar configuration and function to the first collar 94', and is mainly used to provide a limiting surface to the switching member 43' and the spiral spring 93' in the axial direction. Preferably, the main body 10' has a limiting structure 111' for providing the limiting surface. In the embodiment as shown in the drawings, the housing 11' forms the limiting structure 111'. Certainly, the limiting structure may also be formed by the gearbox 12'. As shown in the drawings, the housing 11' forms the limiting structure 111' and the gearbox 12' is provided with a third collar 95' for limiting the position of the housing 11'.

The spiral spring 93' can always force the switching member 43' to align the axial pressing wall surface 431a' with the axial position of the positioning hole 422'. At that moment, the first collar 94' can limit the switching member 43' so that the installing member 42' is not pushed out by the spiral spring 93', and the user can force the switching member 43' to move closer to the main body 10' so that the axial releasing groove 432a' is aligned with the axial position of the positioning hole 422', thereby the moving member 41' can move to a position for releasing the locking.

Preferably, the axial sizes of the axial releasing groove 432a' and the axial pressing wall surface 431' may be designed appropriately so that when the switching member 43' bears against the limiting structure 111', the axial releasing groove 432a' is just aligned with the positioning hole 422', thus the user can operate the tool more easily and definitely realizes that the axial releasing groove 432a' has been aligned with the positioning hole 422'.

The above illustrates and describes basic principles, main features and advantages of the present invention. Those skilled in the art should appreciate that the above embodiments do not limit the present invention in any form. Technical solutions obtained by equivalent substitution or equivalent variations all fall within the scope of the present invention.

What is claimed is:

1. A rotary tool, comprising:
    a motor;
    a transmission assembly driven by the motor;
    a main shaft driven to rotate by the transmission assembly;
    a gearbox for accommodating the transmission assembly;
    a housing for accommodating the motor, a portion of the gearbox and a portion of the main shaft;
    a quick installing chuck capable of being installed on the main shaft and synchronously rotated with the main shaft;
    a clutch assembly for adjusting a torque output by the main shaft; and
    a locking assembly for locking the quick installing chuck to the main shaft;
    wherein the gearbox comprises a front end portion arranged outside of the housing and having a shaft hole for accommodating the main shaft,
    wherein the main shaft has a torque groove in a front end thereof,
    wherein the quick installing chuck comprises:
        a chuck body;
        a transmission shank capable of being inserted in the torque groove of the main shaft; and
        a locking bush surrounding the transmission shank and having a locking groove in the outer wall thereof, wherein the clutch assembly comprises:
a clutch cup arranged to accommodate the front end portion of the gearbox and rotate about the axis of the main shaft,
wherein the locking assembly comprises:
an installing member arranged to accommodate a portion of the locking bush and having at least one positioning hole;
a switching member fixed to the clutch cup; and
a moving member arranged in the positioning hole of the installing member and capable of being partly embedded in the locking groove of the locking bush, and
wherein the installing member is fixedly arranged on the front end portion of the gearbox, and the main shaft passes through the installing member.

2. The rotary tool according to claim 1, wherein the moving member is spherical; the installing member is a sleeve with a portion protruding from the gearbox and having the positioning hole; the switching member is an annular member surrounding the installing member; the switching member comprises:
a pressing portion for pressing the moving member to be embedded in the locking groove;
a releasing portion for accommodating the moving member and enabling the moving member to retract from the locking groove; and
the pressing portion and the releasing portion are formed on the inner side of the switching member and the releasing portion is recessed outwardly relative to the pressing portion.

3. The rotary tool according to claim 2, wherein the positioning hole is an axisymmetric hole.

4. The rotary tool according to claim 3, wherein the positioning hole comprises:
an accommodating section having a hole diameter larger than the diameter of the moving member;
a limiting section having a hole diameter smaller than the diameter of the moving member; and
the accommodating section is arranged further away from the main shaft than the limiting section.

5. The rotary tool according to claim 2, wherein the releasing portion comprises a notch groove passing through the pressing portion and the pressing portion comprises an arc-shaped inner wall.

6. The rotary tool according to claim 5, comprising a pair of notch grooves.

7. The rotary tool according to claim 6, wherein the pair of notch grooves are spaced from each other by 150 degree in the circumferential direction.

8. The rotary tool according to claim 1, further comprising:
a circumferential positioning assembly;
wherein the clutch cup has a plurality of stopping grooves distributed equally in the circumferential direction at one end thereof, the housing has at least one accommodating groove with the circumferential positioning assembly therein, and the circumferential positioning assembly comprises a spiral spring and a steel ball capable of embedding in the stopping grooves.

9. The rotary tool according to claim 8, wherein the switching member and the clutch cup are rotatable synchronously.

10. The rotary tool according to claim 9, wherein the clutch cup comprises a fixing plate for fixing the switching member and the fixing plate comprises at least one installing post protruding from one side opposite to the switching member.

11. A rotary tool, comprising:
a main body;
a main shaft capable of being rotated relatively to the main body;
a chuck capable of being rotated with the main shaft; and
a locking assembly capable of locking the chuck at a fixed position relative to the main shaft in the axial direction,
wherein the locking assembly is arranged fixedly relative to the main body in the circumferential direction of the main shaft and comprises a portion that is contacted with the chuck when the locking assembly is used to lock the chuck,
wherein the locking assembly comprises:
a moving member capable of moving between a first position and a second position that is further away from the main shaft than the first position for locking the chuck in at least in the first position and unlocking the chuck in the second position; and
a limiting assembly for limiting movement of the moving member,
wherein the limiting assembly comprises:
an installing member for accommodating the moving member and for preventing the moving member from moving closer to the main shaft in the radial direction thereof; and
a switching member capable of being in a first operating position or a second operating position switchable to each other, and
wherein, when the switching member is in the first operating position, the switching member limits the moving member in a position closer to the main shaft than the second position and, when the switching member is in the second operating position, the switching member accommodates the moving member in the second position.

12. The rotary tool according to claim 11, wherein the switching member has an annular member surrounding the installing member, the switching member comprises:
a pressing portion for pressing the moving member in the first position; and
a releasing portion for releasing the moving member from locking the chuck;
the installing member has at least one hole for accommodating the moving member and extends in the radial direction of the main shaft, the pressing portion is capable of aligning with the hole when the switching member is in the first operating position, and the pressing portion is capable of aligning with the hole when the switching member is in the second operating position.

13. The rotary tool according to claim 12, wherein the locking assembly further comprises a positioning assembly for maintaining the switching member in the first operating position or the second operating position, the switching member forms a sliding connection with the main body along the axial direction of the main shaft, and the pressing portion and the releasing portion are distributed in different axial positions.

14. The rotary tool according to claim 13, wherein the moving member is spherical, the hole is an axisymmetric hole with a symmetric axis perpendicular to the axial direction, the hole comprises:
an accommodating section having a hole diameter larger than the diameter of the moving member;

a limiting section having a hole diameter smaller than the diameter of the moving member and;

the accommodating section is arranged further away from the main shaft than the limiting section;

the installing member is a sleeve which is accommodating the main shaft, the hole is arranged in the wall of the sleeve, and different holes are arranged in the same axial direction position and in the different circumferential positions.

15. The rotary tool according to claim 13, wherein the pressing portion comprises an axial pressing wall surface formed as a cylindrical surface, the releasing portion defines an axial releasing groove formed as a annular groove and recessed relative to the axial pressing wall surface, and the axial pressing wall surface and the axial releasing groove are arranged in different axial positions.

16. The rotatory tool according to claim 15, wherein the positioning assembly comprises:

a circumferential positioning assembly for maintaining the releasing portion of the switching member in a preset position in the circumferential direction.

17. The rotary tool according to claim 15, wherein the sliding restoration member comprises a spiral spring;

the first limiting member comprising a first collar fixed to the installing member; and the rotating restoration member comprising a torque spring.

18. The rotary tool according to claim 13, wherein the switching member forms an axial sliding connection with the main body, the positioning assembly comprises:

a sliding restoration member for forcing the switching member to restore to the first operating position;

a first limiting member for preventing the switching member from moving away from the main body; and a second limiting member for preventing the switching member from moving close to the main body.

19. The rotary tool according to claim 12, wherein the locking assembly further comprises a positioning assembly for maintaining the switching member in the first operating position or the second operating position, the switching member forms a rotating connection with the main body about an axis of the main shaft, and the pressing portion and the releasing portions having the same axial position and being distributed in different circumferential positions.

20. The rotary tool according to claim 19, wherein the pressing portion comprises at least two sections of arc-shaped circumferential pressing wall surfaces formed in different circumferential positions in the switching member, the releasing portion defines a circumferential releasing groove formed as a groove recessed relative to the circumferential pressing wall surfaces; and the circumferential releasing groove is arranged between the two circumferential pressing wall surfaces in the circumferential direction.

21. The rotary tool according to claim 20, wherein the circumferential positioning assembly comprising a spiral spring retractable along the axial direction;

a ball member pushed out by the spiral spring along direction away from the main body;

the main body has an accommodating groove for accommodating the spiral spring and a portion of the ball member; and the switching member has a stopping groove capable of accommodating a portion of the ball member.

22. The rotary tool according to claim 19, wherein the switching member forms a rotating connection with the main body, the positioning assembly comprises:

a rotating restoration member for forcing the switching member to restores to the first operating position.

23. The rotary tool according to claim 11, wherein the chuck comprises a locking bush capable of accommodating the main shaft, and the locking bush defines an annular stopping groove arranged on the outer wall of the lock bush.

* * * * *